United States Patent
Li et al.

(10) Patent No.: US 10,445,697 B2
(45) Date of Patent: Oct. 15, 2019

(54) SYSTEM FOR SELECTION OF DATA RECORDS CONTAINING STRUCTURED AND UNSTRUCTURED DATA

(71) Applicant: HARTFORD FIRE INSURANCE COMPANY, Hartford, CT (US)

(72) Inventors: Bixia Li, South Windsor, CT (US); Arthur Paul Drennan, III, West Granby, CT (US); Brian J. Gooley, Farmington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 13/684,783

(22) Filed: Nov. 26, 2012

(65) Prior Publication Data

US 2014/0149144 A1  May 29, 2014

(51) Int. Cl.
| | | |
|---|---|---|
| G06Q 40/00 | (2012.01) | |
| G06Q 10/10 | (2012.01) | |
| G06F 17/27 | (2006.01) | |

(52) U.S. Cl.
CPC ......... *G06Q 10/10* (2013.01); *G06F 17/2785* (2013.01)

(58) Field of Classification Search
CPC ........ G06Q 40/00; G06Q 10/10; G06Q 40/08; G06F 17/2785
USPC .......................................................... 705/36
See application file for complete search history.

(56) References Cited

U.S. PATENT DOCUMENTS

| | | |
|---|---|---|
| 5,136,647 A | 8/1992 | Haber et al. |
| RE34,954 E | 5/1995 | Haber et al. |
| 5,557,515 A | 9/1996 | Abbruzzese et al. |
| 5,819,226 A | 10/1998 | Gopinathan et al. |
| 5,875,431 A | 2/1999 | Heckman et al. |
| 5,956,687 A | 9/1999 | Wamsley et al. |
| 5,991,733 A | 11/1999 | Aleia et al. |
| 6,009,407 A | 12/1999 | Garg |
| 6,687,708 B1 | 2/2004 | Brobst et al. |
| 6,766,307 B1 | 7/2004 | Israel et al. |
| 6,810,382 B1 | 10/2004 | Wamsley et al. |
| 7,107,239 B2 | 9/2006 | Graff |
| 7,167,839 B1 | 1/2007 | Layne |
| 7,191,150 B1 | 3/2007 | Shao et al. |
| 7,343,308 B1 | 3/2008 | Rojewski et al. |
| 7,392,201 B1 | 6/2008 | Binns et al. |
| 7,624,031 B2 | 11/2009 | Simpson et al. |

(Continued)

OTHER PUBLICATIONS

John Mutch, "Technology: Unlocking the Neural Network", Risk & Insurance, Jan. 1999, 4 pages.

(Continued)

*Primary Examiner* — Mike Anderson
(74) *Attorney, Agent, or Firm* — Howard IP Law Group

(57) ABSTRACT

A computer system for processing data relating to injury claims to determine suitability for subrogation includes one or more data storage devices storing structured and unstructured data relating to insurance claims, a processor configured to access the one or more data storage devices to select claims for review, apply a text mining tool to extract data from the unstructured data associated with the selected claims, and apply a predictive model to the unstructured data and structured data associated with the selected claims to identify a likelihood of suitability for subrogation of each of the selected claims.

19 Claims, 9 Drawing Sheets

(56) References Cited

U.S. PATENT DOCUMENTS

| | | | |
|---|---|---|---|
| 7,962,385 | B2 | 6/2011 | Falk et al. |
| 7,966,204 | B1* | 6/2011 | Hail et al. .................. 705/4 |
| 2001/0005836 | A1 | 6/2001 | Yang |
| 2002/0002475 | A1 | 1/2002 | Freedman et al. |
| 2002/0035488 | A1 | 3/2002 | Aquila et al. |
| 2002/0059139 | A1 | 5/2002 | Evans |
| 2002/0077972 | A1 | 6/2002 | Wilwerding et al. |
| 2002/0087567 | A1 | 7/2002 | Spiegler et al. |
| 2004/0111302 | A1 | 6/2004 | Falk et al. |
| 2005/0010454 | A1* | 1/2005 | Falk .................. G06Q 10/10 705/4 |
| 2005/0086180 | A1 | 4/2005 | Wamsley et al. |
| 2005/0091080 | A1 | 4/2005 | Biats, Jr. |
| 2007/0043659 | A1 | 2/2007 | Kass et al. |
| 2007/0174094 | A1 | 7/2007 | Ramsey |
| 2007/0185743 | A1 | 8/2007 | Jinks |
| 2007/0288272 | A1 | 12/2007 | Marks et al. |
| 2007/0288273 | A1* | 12/2007 | Rojewski et al. .................. 705/4 |
| 2008/0109027 | A1 | 5/2008 | Chen et al. |
| 2008/0154651 | A1 | 6/2008 | Kenefick et al. |
| 2008/0243556 | A1 | 10/2008 | Hogan et al. |
| 2009/0187432 | A1 | 7/2009 | Scalet et al. |
| 2009/0192867 | A1 | 7/2009 | Farooq et al. |
| 2009/0222290 | A1 | 9/2009 | Crowe |
| 2009/0254379 | A1 | 10/2009 | Adams et al. |
| 2009/0300065 | A1 | 12/2009 | Birchall |
| 2010/0057498 | A1 | 3/2010 | Stephen et al. |
| 2010/0198637 | A1 | 8/2010 | Jenkins et al. |
| 2011/0066454 | A1* | 3/2011 | Rosauer .................. G06N 5/022 705/4 |
| 2012/0059677 | A1 | 3/2012 | Crowe |
| 2013/0006614 | A1* | 1/2013 | Hogan et al. .................. 704/9 |
| 2013/0304517 | A1* | 11/2013 | Florence .................. 705/4 |

OTHER PUBLICATIONS

Leslie Werstein Hann, "High-tech Sleuths", Best Review (Property/Casualty insurance edition), Oldwick: Nov. 1998; 99: 7, p. 83-85.

Mosley, R. The Use of Predictive Modeling in the Insurance Industry. Pinnacle Actuarial Resources Inc. (Jan. 2005) 4 pages.

Woodfield, Terry J. Paper 071-30. Predicting Workers' Compensation Insurance Fraud Using SAS Enterprise Miner 5.1 and SAS Text Miner. 2004 6 pages.

Conger et al. Emphasis 2006/4. Predictive Modeling in Workers Compensation. pp. 18-21.

Deloitte & Touche. Presentation Predictive Modeling for Claims: The New Claim Frontier (2006) 31 pages.

Magnify Press Release. Erie Insurance Reduces Fraud Losses with Fraud Focus. Predictive Modeling Demonstrates Effectiveness for Auto, Property and Worker's Comp. (Feb. 4, 2005) 2 pages.

Magnify Press Release. Magnify Applies Predictive Modeling to Worker's Comp Underwriting and Fraud Detection. Chicago, IL (Mar. 1, 2005) 2 pages.

Woodfield, Terry J. Predictive Modeling in the Insurance Industry Using SAS Software. SUGI 26 Proceedings. Paper 13-26 (2001) 5 pages.

Ellingsworth, M. et al. Text Mining Improves Business Intelligence and Predictive Modeling in Insurance. DM Review. (Jul. 2003) 6 pages.

Francis, Louise A. Taming Text: An Introduction to Text Mining. Casualty Actuarial Society Forum. pp. 51-88 (Winter 2006).

Popowich, Fred. Using Text Mining and Natural Language Processing for Health Care Claims Processing. SIGKDD Explorations. 7:1, 59-66 (Jun. 2005).

* cited by examiner

| | YKVC3266 | | | YKSC05170 | | | YLAC53162 | | |
|---|---|---|---|---|---|---|---|---|---|
| | Variable | Coefficient | Value | Variable | Coefficient | Value | Variable | Coefficient | Value |
| CDC | Intercept | -5.42 | | Intercept | -5.42 | | Intercept | -5.42 | |
| | CDC 12 | 3.22 | Veh Not Pub Transp (WC) | CDC 8/9 | 2.81 | Animal Attack (WC) | CDC 1 | -1.75 | Motion Tendonitis |
| Complexity | COM 5 | 0.51 | Hex State Act Trauma Subro | COM 2 | 0 | Core State Act Trauma | COM 3 | 0 | Intermediate State Act Cumulative Inj |
| Coverage | COV 3 | 3.02 | | COV 2 | 0 | | COV 1 | -2.40 | |
| Accident State | AS 9 | 1.01 | FL | AS 3 | 0 | KY | AS 2 | 0 | ME |
| Nature of Injury | NOI 9 | 0.58 | Crush | NOI 4 | 0 | All other NOI | NOI 4 | 0 | Strain |
| Average Weekly Wage | AWW 11 | 0 | 3298 | AWW 3 | 0 | 280 | AWW 1 | 0 | 460 |
| Responsible Party | Responsible Party | 0 | 0 | Responsible Party | 0 | 0 | Responsible Party | 0 | 0 |
| Landlord | Landlord | 0 | 0 | Landlord | 0 | 0 | Landlord | 0 | 0 |
| Third Party | Third Party | 0.42 | 1 | Third Party | 0 | 0 | Third Party | 0.51 | 0 |
| Low Subro | Low Subro | 0 | 0 | Low Subro | 0 | 0 | Low Subro | 0 | 0 |
| Contractor | Contractor | 0 | 0 | Contractor | 0 | 0 | Contractor | 0 | 0 |
| Model Value | | 3.32 | | | -2.61 | | | -9.06 | |
| Relative Score | | 86% | | | 43% | | | 13% | |

Fig. 6

SYSTEM FOR SELECTION OF DATA RECORDS CONTAINING STRUCTURED AND UNSTRUCTURED DATA

FIELD OF INVENTION

The present invention relates to computer systems, and particularly to computer systems for use in the financial services field, and more particularly to computer systems for use in connection with insurance relating to injuries.

BACKGROUND

Insurance claims arise in a variety of contexts, including insurance coverage for individuals, or personal lines, such as personal property coverage and personal automotive coverage, as well as business insurance coverage. Examples of categories of business insurance coverage include claims relating to employee injuries, including workers compensation claims, short term disability claims and long term disability claims. These types of claims are often underwritten by insurance companies, or are self-insured by large employers. The costs associated with these claims for insurance companies and self-insuring employers include the cost of medical services provided to injured employees, and income replacement payments provided to employees during a period when the employees are unable to perform their customary job duties.

While insurance provides for medical expenses and partial replacement of lost income, generally regardless of responsibility for the injury, in some cases, another party is legally responsible for the injury. For example, in the event of an automobile accident, an individual insured driver or an employee of an insured business may be injured. If the negligence of another driver caused the automobile accident, then the insurance company or, in the case of the injured employee, a self-insuring employer, may be entitled to subrogation. By subrogation, the insurance company or self-insured employer stands in the shoes of the injured individual and can seek civil damages or a settlement from the negligent party, or the negligent party's insurer. Similarly, in the event of a claim for covered property damage, the property owner's insurance coverage may pay a claim to cover the cost of repairs, but then seek subrogation against a responsible party.

A wide variety of factual circumstances may give rise to a right in the insurance company or self-insured employer to subrogation. For example, an employee may be injured as a result of malfunctioning equipment. The malfunction may result from defective design or manufacture of the equipment or a part, or incorrect maintenance by a contractor. Similarly, property of an insured individual may be damaged as a result of defective manufacture or maintenance of such items as household appliances, heating, ventilation and air conditioning systems, and other items.

If a claim handler identifies that a claim may be suitable for subrogation, the claim handler refers the claim to an insurance claims recovery operation of the insurance company. However, the claim handler may not accurately identify all claims that have subrogation potential, thereby resulting in an absence of subrogation recovery. For example, the claim handler may be provided with rules such as excluding all injuries of certain types from consideration for subrogation. On the other hand, if a claim handler refers to a claims recovery operation excessive numbers of claims with little or no subrogation potential, the resources of the claims recovery operation are misdirected to review of those low potential referred claims.

Systems and methods that provide for superior identification of subrogation opportunities would be desirable.

SUMMARY

In an embodiment, a computer system for processing data relating to determination of suitability for subrogation of insurance claims includes one or more data storage devices storing: data relating to the insurance claims, the stored data comprising: structured data and unstructured data, the unstructured data comprising data indicative of communications between claim handlers and one or more other persons; data defining a predictive model for assessing suitability for subrogation of claims based on review of the structured data and words and phrases extracted from the data indicative of the unstructured data. The system further includes at least one processor in communication with the one or more data storage devices and configured to, on a periodic basis: determine a set of claims for review including new claims and selected previously-reviewed claims; apply text mining to the data indicative of the unstructured data to extract words and phrases from the unstructured data; and apply the predictive model to the structured data and the extracted words and phrases from the unstructured data to determine a subrogation score associated with each of the claims in the set. The one or more processors are further configured to, for each of the previously-reviewed claims, determine whether the subrogation score is greater than on previous review; and generate a report including at least some of the new claims and the previously reviewed claims having a greater subrogation score.

In an embodiment, a computer-implemented method for processing data for determination of suitability for subrogation of insurance claims, includes on a periodic basis accessing by a processor from one or more data storage devices data relating to insurance claims to determine a set of claims for review, the selected claims including new claims and previously-reviewed claims, the stored data including structured data and unstructured data, the unstructured data including data indicative of communications between claim handlers and one or more other persons. The method further includes processing by the processor using text mining the unstructured data to extract words and phrases from the unstructured data, and applying, by the processor, a predictive model for assessing suitability for subrogation of claims based on review of the structured data and words and phrases extracted from the unstructured data, to the structured data and the extracted words and phrases from the unstructured data to determine a subrogation score associated with each of the claims in the set. The method further includes determining by the processor, for each of the previously-reviewed claims, whether the subrogation score is greater than on previous review; and generating by the processor a report including at least some of the new claims and the previously reviewed claims having a greater subrogation score.

In an embodiment, a non-transitory computer-readable storage medium has stored processor-executable instructions, which instructions, when executed by a processor, cause the processor to: on a periodic basis, access from one or more data storage devices data relating to claims to determine a set of claims for review, the selected claims including new claims and previously-reviewed claims, the stored data comprising structured data and unstructured data, the unstructured data comprising data indicative of communications between claim handlers and other persons; process using text mining the data indicative of notes of the unstructured data to extract words and phrases from the unstructured data; apply a predictive model for assessing suitability for subrogation of claims based on review of the structured data and words and phrases extracted from the data indicative of notes of the unstructured data, to the structured data and the extracted words and phrases from the unstructured data to determine a subrogation score associated with each of the claims in the set; determine, for each of the previously-reviewed claims, whether the subrogation score is greater than on previous review; and generate a report including at least some of the new claims and the previously reviewed claims having a greater subrogation score.

BRIEF DESCRIPTION OF DRAWINGS

FIG. 6 illustrates analysis by a predictive model of three claims in an exemplary embodiment.

DETAILED DESCRIPTION

Figure 1:
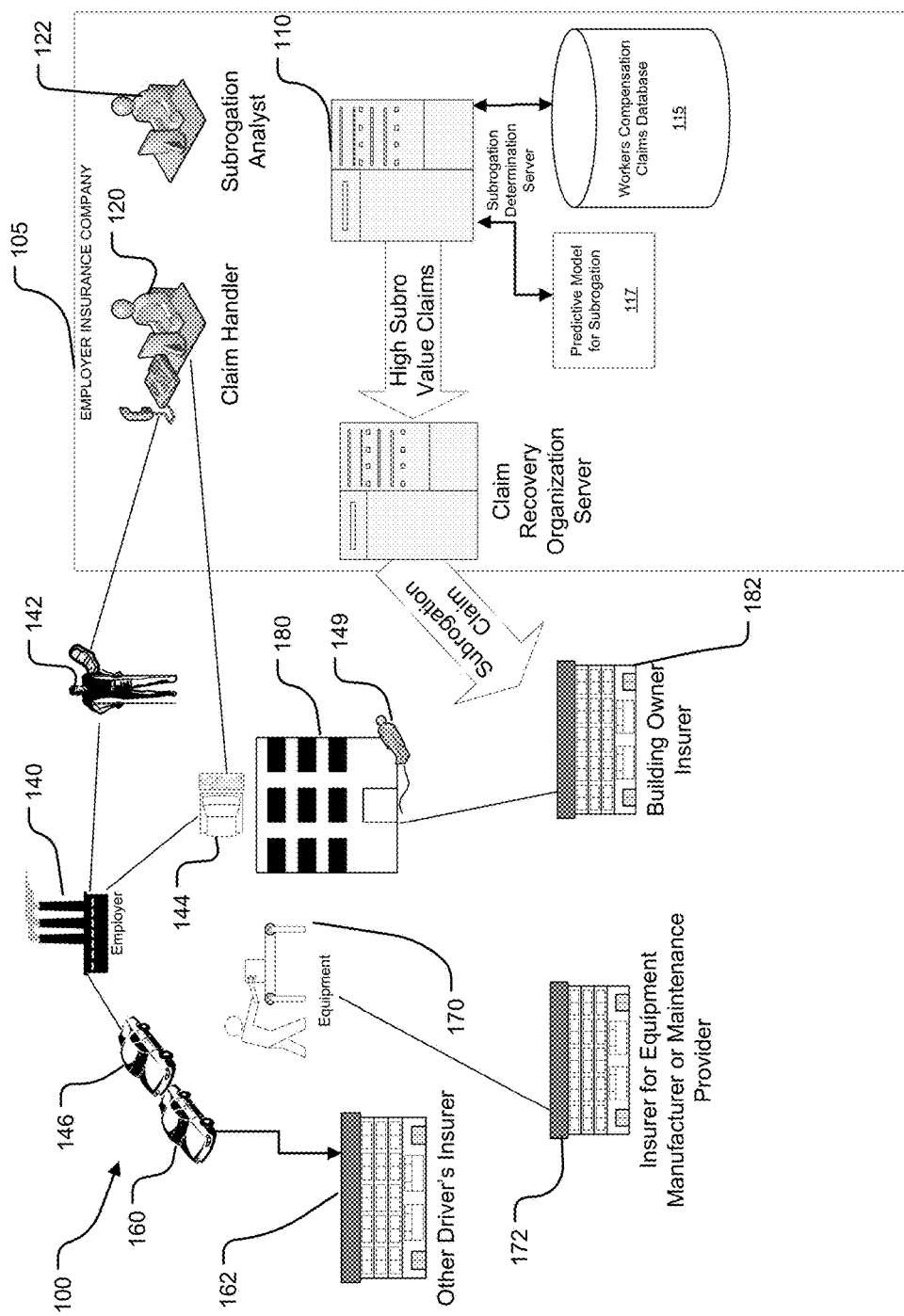
FIG. 1 is a schematic diagram showing an environment in which a computer system for processing data relating to assessment of workers compensation and other claims for subrogation potential may be implemented.

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to insurance services and programs such as analysis of data sets, determination of potential for subrogation, and administration of insurance claims. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

In connection with administration of insurance claims, including claims relating to property damage, liability and injuries, by way of example, a wide variety of documents are generated. Such documents include documents prepared and submitted by claimants, representatives of claimants, representatives of policy holders other than claimants, such as representatives of employers of injured workers, and third parties, such as medical offices, contractors and auto body shops, for example. In addition, claim handlers generally represent an insurance company or self-insured entity employer in dealing with claimants, employers, third parties such as contractors and medical service providers and others, and create telephone notes, structured documents and the like. For example, claim handlers typically enter extensive notes regarding telephone conversations with claimants, witnesses, employer representatives, and others. Typically, the principal focus of the efforts of the claim handlers in connection with a claim is to obtain information that can be used to determine whether an injury is covered. For example, if the claim is a claim for workers compensation, the facts to be determined by the claim handler may include where the injury occurred, including whether the location of the injury was on an employer's premises or not, the time of day, the working hours of the claimant on the day of the injury, the relationship of the injured individual's activities to employment duties, and the details of the injury. The notes and other data are stored by a computerized system in a database associated with the claim. The data associated with the claim may include either or both of structured data and unstructured data, such as file notes in text format.

In an embodiment, a computer system is configured to apply a predictive model to determine a likelihood of subrogation potential for insurance claims in a claim database. The system may be configured to iteratively apply the predictive model to claims at intervals. The intervals may be one or more selected aging intervals of the claims, dated from a suitable start date, such as a date of initial review. The predictive model may apply values to data among structured indicators and among text indicators. Selected structured indicators may have negative and positive weightings on the subrogation potential of the claim. By way of example, speed of reporting of an incident leading to a claim, such as an injury, if a short report lag time from incident to report, may have a positive weight, while a long report lag time from incident to report may have a negative weight. Thus, a report lag indicator may have a positive coefficient for a short report lag value and a negative coefficient for a long report lag value.

A claim complexity indicator may have a positive weighting, greater than that of speed of reporting, if a high level of complexity is recorded, or a negative weighting, if a low level of complexity is recorded. Complexity refers to severity of injuries, in general.

The system is further configured to perform text mining of unstructured data associated with the claims. The unstructured data may include notes of telephone conversations and in-person meetings conducted with claimants, witnesses, third party service providers such as body shop representatives, employer representatives and others, as well as recorded telephone conversations converted to text using voice recognition technology. Certain words identified in the notes may be associated with a higher value of likelihood of subrogation. By way of example, words such as landlord, contractor or supplier tend to indicate a third party and are therefore associated with a higher probability of subrogation. On the other hand, some words or phrases are associated with a reduced value of subrogation, such as "claim denied."

The values and variables may be dependent on data related to a type of claim, such as property damage, automobile accident, or injury to employee, or to an injured employee or a covered employer. By way of example, if data indicates that the claim relates to a dog bite injury suffered by an employee, and the employer is of a type that ordinarily handles animals, such as a dog groomer or veterinarian, an animal bite injury decreases the likelihood of subrogation. On the other hand, if the data indicates that the employer is not in a category that ordinarily handles animals, an animal bite is associated with an increase in likelihood of subrogation.

The system may be configured to review each claim file on a periodic basis to determine any change in subrogation potential values. In embodiments, the review may be on a basis other than periodic, such as based on a number of new claims received since the most recent review.

Referring now to FIG. 1, an exemplary system 100 for processing data related to assessment of subrogation potential is shown is shown in an exemplary environment. System 100 includes insurance company 105 elements, which includes subrogation likelihood determination system server 110, which may be in communication via an internal network, such as an insurance company intranet or local area network, with claims database 115. Database 115 includes data relating to claims. The data relating to claims may include data relating to types of claims and structured data which may be partly particular to the type of claim. For example, for claims relating to injured employees, structured data may include employee and employer identities, dates of claim submission and type of injury. For any claim type, unstructured data related to the claim may be included in the database. For injury claims, the data may include structured and unstructured data relating to the nature of the injury, place and time of occurrence, other persons involved, and other data. Server 110 is also in communication with predictive model 117, which may include executable computer-readable instructions and stored data for analysis of claim data from database 115 and determination of subrogation potential values. Exemplary users of system 100 include claim handler 120 who records claim data via a user device, which claim data directly or indirectly received, stored and organized in claims database 115, and subrogation analyst 122 who accesses server 110 via a user device to review and analyze claim data and subrogation likelihood data and analyses. Results of subrogation analyses provided by server 110 may be displayed for subrogation analyst 122. Data relating to claims identified as having high subrogation value may be furnished to claim recovery organization server 130. Claim recovery organization server 130 may perform data processing services for a claim recovery organization of an insurance company, as discussed further below.

The system 100 provides services in the context of employer 140, which may be an insured or have an affiliated insured group providing coverage for employee injuries. The coverage may include workers compensation coverage, short term or long term disability coverage, or other coverage involving treatment for injuries that cause the employee to be disabled and unable to perform the employee's customary employment duties. The system 100 may also perform administrative services for an employer 140 that self-insures, or may perform administrative and/or data processing services on behalf of another insurance entity that underwrites coverage for employer 140.

Injured employees, such as injured employee 142, may provide information regarding the circumstances of the injury to claim handler 120, by any suitable method, including by voice telephone discussion as shown in FIG. 1. Employer representatives may communicate with claim handler 120 such as via computer system 144.

Common situations giving rise to subrogation are illustrated. For example, employer vehicle 146 has collided with another vehicle 160. Insurance company 162 provides coverage to the owner of vehicle 160. Employer machinery 170, operated by employee 143, was manufactured or maintained by a third party, which third party has coverage from insurance company 172. Employee 149 has fallen on the sidewalk of building 180. The building owner is covered by insurance company 182.

Claim recovery organization server 130 provides data processing services relating to assertion of subrogation claims against insurance company 162, insurance company 172 and insurance company 182. Those subrogation claims include claims identified by analysis by server 110 employing predictive model 117. Claims may be added to a work queue for a claim recovery operation staff based on results of analysis by subrogation determination server 110. While FIG. 1 illustrates circumstances relating to subrogation in the context of insurance company review of claims relating to injured employees, it will be appreciated that the same principles, such as seeking subrogation from insurance companies of other drivers in the automotive coverage context, or insurance companies of other parties such as contractors, appliance manufacturers or others, applies to other factual situations and other types of policies. Similarly, a third party administrator may perform the subrogation analysis function. A third party administrator may be engaged by an insurance company to perform claims administration functions, which may include evaluation of claims for subrogation. In embodiments, a third party administrator may return a listing of claims to an insurance company for processing by a claim recovery operation. For example, a third party administrator computer system may generate data indicative of subrogation potential for claims and provide output data via any suitable method to a computer system employed by an insurance company claim recovery operation.

In embodiments, a claim recovery operation and a subrogation determination system may employ one or more elements of the same computer system. For example, both the claim recovery operation and the subrogation determination system may access computer systems and databases for storing and maintaining data relating to insurance claims data, such as workers compensation claims. In embodiments, a single hardware server or other hardware devices including one or more processors may execute one or more modules configured to perform data processing relating to determining subrogation potential of insurance claims and one or more modules configured to perform data processing relating to claim recovery.

In embodiments, a claim recovery operation may perform various operations in addition to seeking payments from responsible parties or their insurers. By way of example, in connection with claims involving ongoing payments, such as workers compensation claims or long term disability claims, the claim recovery operation may seek risk transfer. If risk transfer is attained, the responsibility for the payments is transferred to another party. In some situations, the claim recovery operation may serve as a settlement adviser to other operations of an insurance company or third party administrator that are engaged in direct negotiations.

Figure 2:
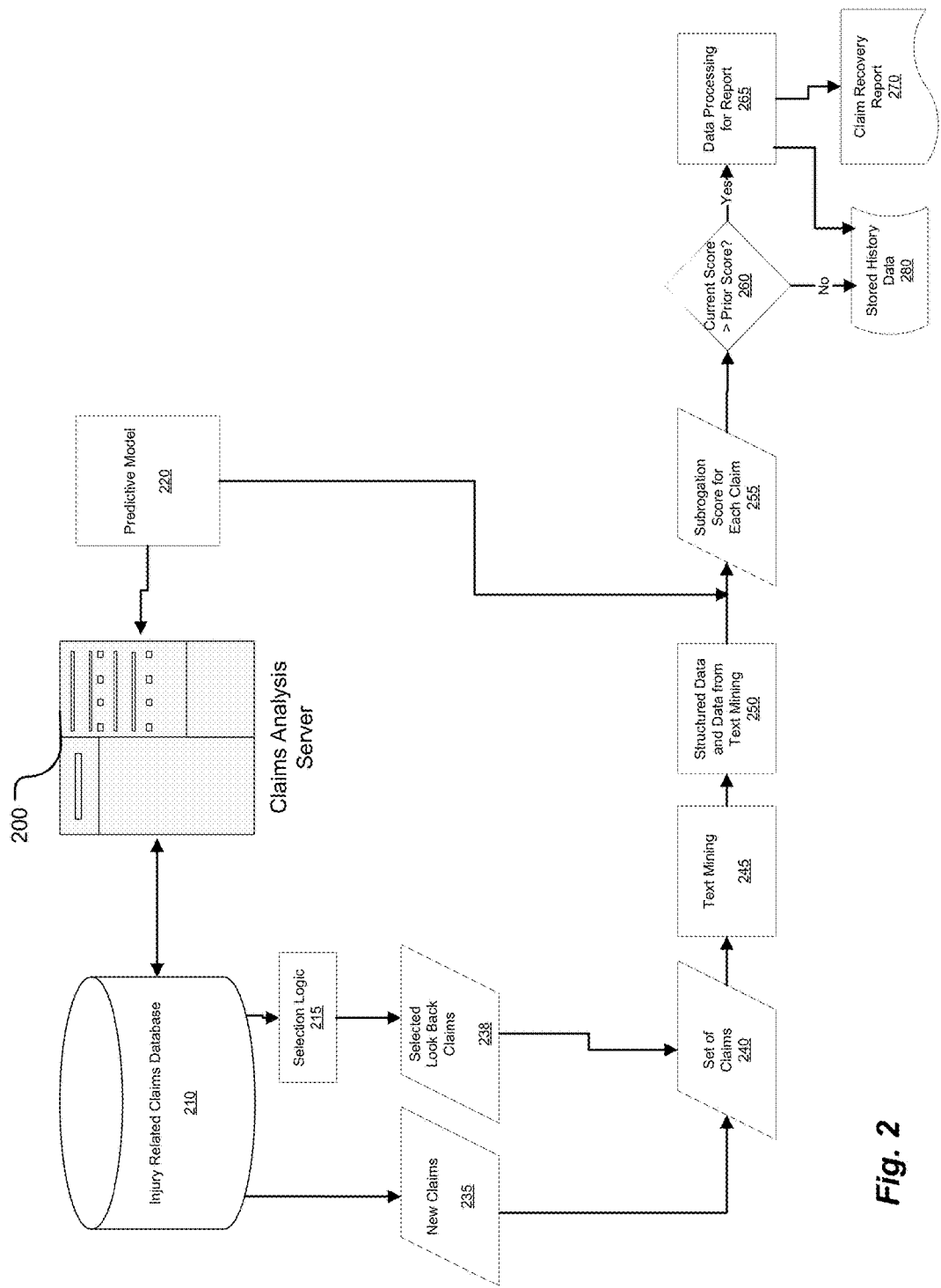
FIG. 2 is a process flow diagram of an exemplary method for processing claim data to assess claims for subrogation potential.

Referring now to FIG. 2, an exemplary process flow of a method of an embodiment that may be performed by claims analysis server 200 using data from claims database 210 and logic of predictive model 220. The method may be performed on a cycle, such as a daily cycle, or a cycle of a period of days, such as between one and fifteen days. The method may commence with identification of data relating to new claims 235, which include all claims newly-added to the database subsequent to the most recent review. Claims are added to the database during routine processing. In embodiments, a claim creation event, such as an initial report of an injury by an employee or an employer representative to an insurance company, generates an initial creation of a claim. There may be a period of time between the claim creation event and the addition of the claim to the database, during which various data verification and other processes may be performed.

The method may further identify data relating to selected claims that were reviewed in a prior cycle, or look back claims 238. The selection logic 215 for look back claims for a given cycle may exclude any claims flagged in the database as having previously been referred to a claim recovery operation. The selection logic for look back claims may select claims at one or more selected ages from initial review or another start age. By way of example, the selection logic may select each claim that is open and not flagged as referred to claim recovery operation on a cycle of every 15 days, on a cycle of every 30 days, or on a more frequent cycle while the claims are relatively new and then less frequently, e.g., 15 days, 30 days, 45 days, 60 days, 90 days, 120 days, and excluding claims above a maximum threshold age, such as 150 days, 180 days or 270 days. Of course, the thresholds and cycles may be expressed in any suitable manner, such as calendar months from a claim creation date associated with the claim.

Upon selection of new claims and application of selection logic 215 for look back claims, a model universe 240 of claims is determined. Text mining 245 may then be applied to unstructured data relating to claims in the model universe 240. Text mining 245 may identify certain words or phrases in the data indicative of notes that are pertinent to determination of suitability for subrogation. Text mining tools may be configured with tools to identify misspelled words correctly, as well as other analytical capabilities. Text mining 245 may be implemented by employing, for example, one of numerous proprietary or open source software tools capable of text mining and configured to identify words or phrases selected for pertinence to determination of suitability for subrogation. Exemplary tools are made available by Attensity of Palo Alto, Calif. Other suitable tools include the STATISTICA text mining software tools available from Statsoft, Inc., of Tulsa, Okla., and the RapidMiner open source software suite available via Rapid-I GmbH of Dortmund, Germany. Text mining identifies words and phrases associated with each claim in the model universe. The identified words and phrases are then stored with logical associations with the claims for analysis using the predictive model. Structured data associated with the selected claims is also employed by the predictive model, and may be extracted and stored in a temporary database to used and available for analysis.

The predictive model 220 may be applied to the identified words and phrases extracted from the text mining process and the structured data relating to the selected claims 250 to determine a set of initial results in the form of a subrogation suitability score for each of the selected claims in the set 255. The predictive model may determine the suitability score by identifying for each claim any element of structured data or element from text mining that have an associated positive or negative factor, and incrementing or decrementing the subrogation suitability score by the positive or negative factor.

For all previously-reviewed claims, the system compares 260 the current subrogation likelihood score to the most recent subrogation likelihood score for the same claim. Responsive to determining that the current subrogation likelihood score is greater than the prior subrogation likelihood score, the system identifies the claim for inclusion in a report 270. All new claims are also included in the report. The data relating to the new claims and identified previously-reviewed claims is processed 265 for report formatting.

Responsive to determining that the current subrogation likelihood score is not greater than the prior subrogation likelihood score, the system identifies the claim for data storage 280, but not for inclusion in a report. The report may be employed for identification of claims suitable for claim recovery.

Figure 3:
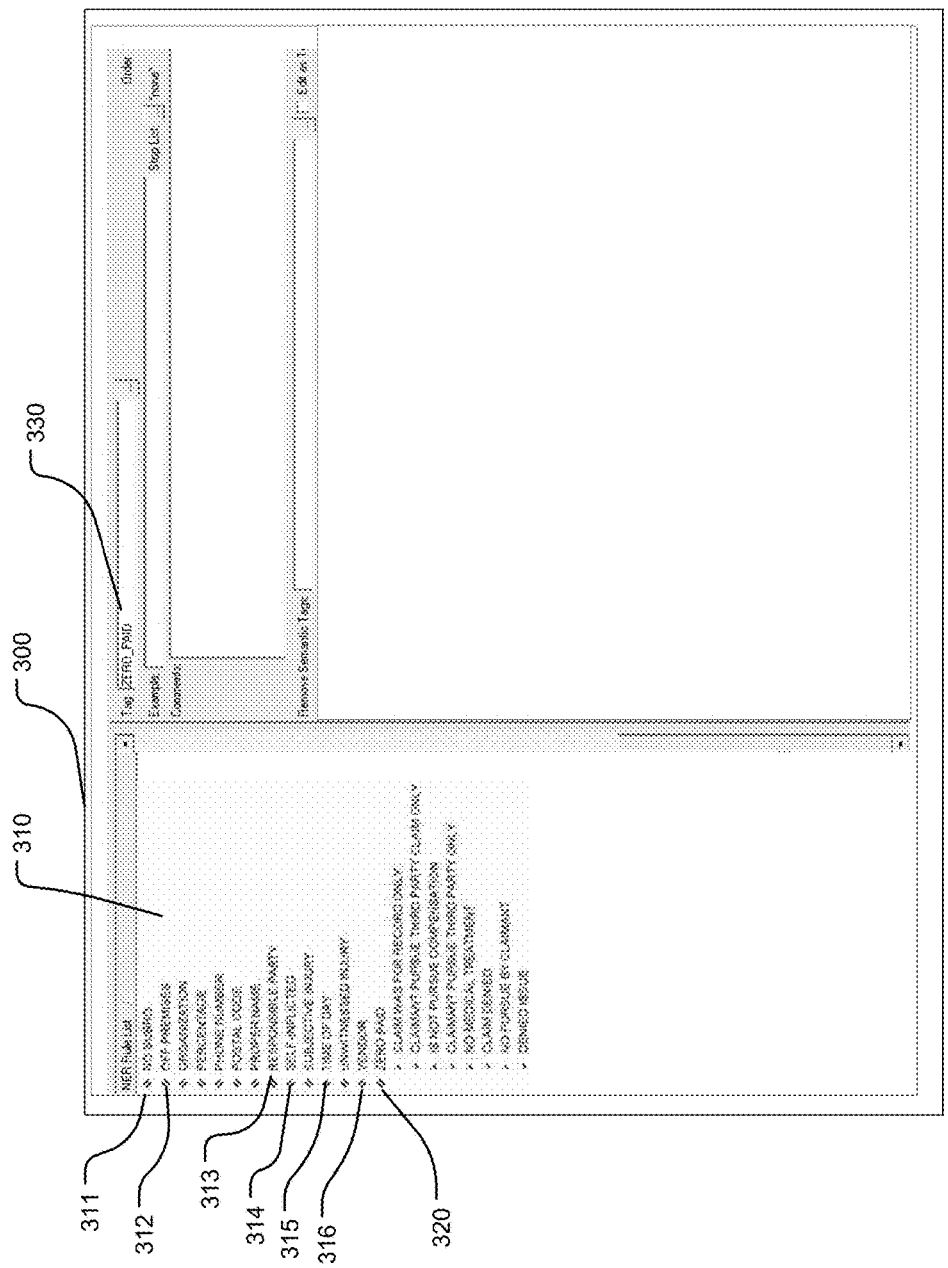
FIG. 3 shows an exemplary screen display for use in configuring text analysis software for use in connection with analyzing unstructured data in a method and system of the invention.

Referring to FIG. 3, window 310 is generated on device 300 and is accessed by an analyst to review and select terms and phrases for use in connection with text mining. Window 310 displays a list of terms that may be designated for selection by a text mining tool. The exemplary list in window 310 is partially customized for selection of text and phrases relevant to subrogation likelihood determinations. Thus, the phrase "no subro" 311, the phrase "off premises" 312, the phrase "responsible party" 313, the phrase "self-inflicted" 314, the phrase "time of day" 315, and the phrase "vendor" 316 appear in window 310 and indicate terms that may be identified in a text mining process. The term "zero paid" 320 is shown with a further menu of individual variations that translate to "zero paid" in the logic of the text mining tool and in tag field 330. Other terms may include variations, not shown, that translate to the higher level term, such as "no subro" or "off premises."

Figure 4:
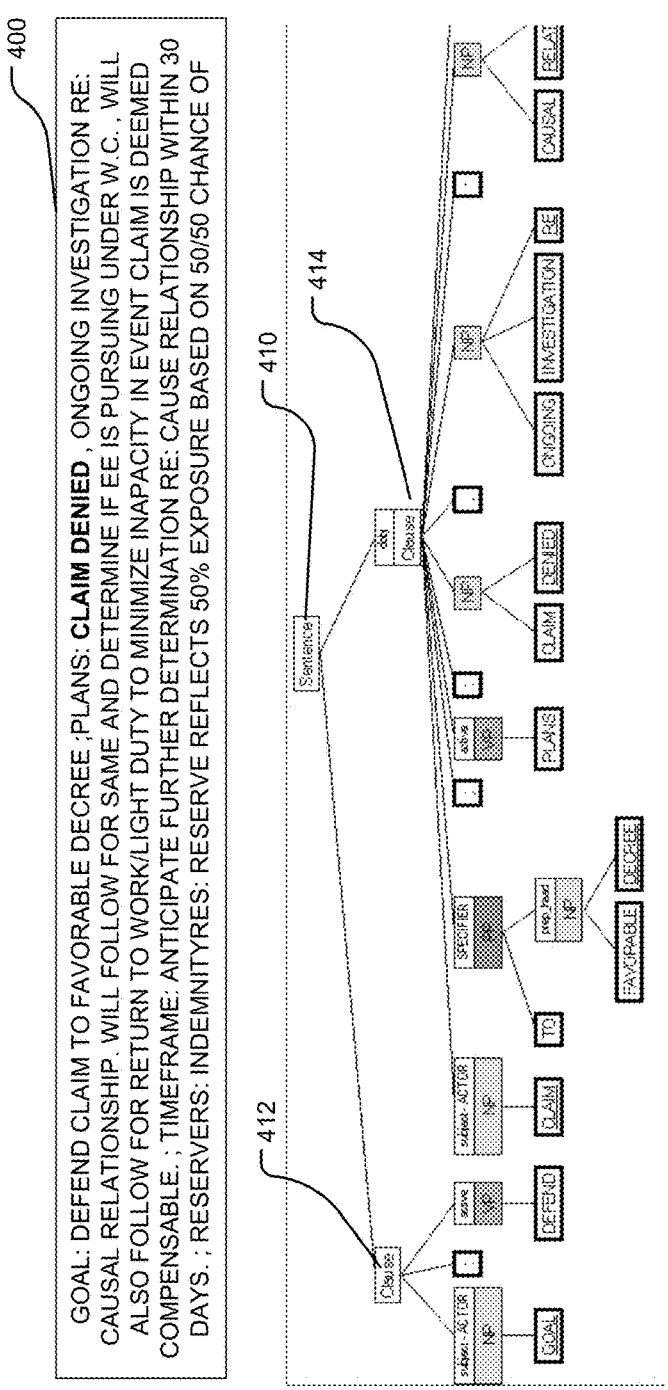
FIG. 4 illustrates an exemplary analysis of unstructured data using a text analysis system in an embodiment of the invention.

Referring now to FIG. 4, exemplary free text and related analysis are shown. Box 400 displays free text notes. The text parsing logic identifies sentences in the free text, including sentence 410. Within sentence 410, clauses 412, 414 are identified, and text is associated with clauses. Suitable tags are applied to each identified word. In clause 412, the term "goal" is identified as being in the "subject-ACTOR" subcategory of the NP category (corresponding generally to nouns) and appropriately tagged. Similarly, the term "defend" is identified as an active subcategory of the VP category, corresponding generally to verbs. In clause 414, the term "to' is identified as a "specifier" in the PP category, and has logically associated therewith, below in the hierarchy, the following terms "favorable" and "decree", which are accordingly tagged as in the "prep_head" subcategory of the "NP" category. The terms "claim" and "denied" are associated together in the NP category under clause 414, and may be flagged by the predictive model. Other examples of hierarchical organization of terms are shown in FIG. 4.

Figure 5:
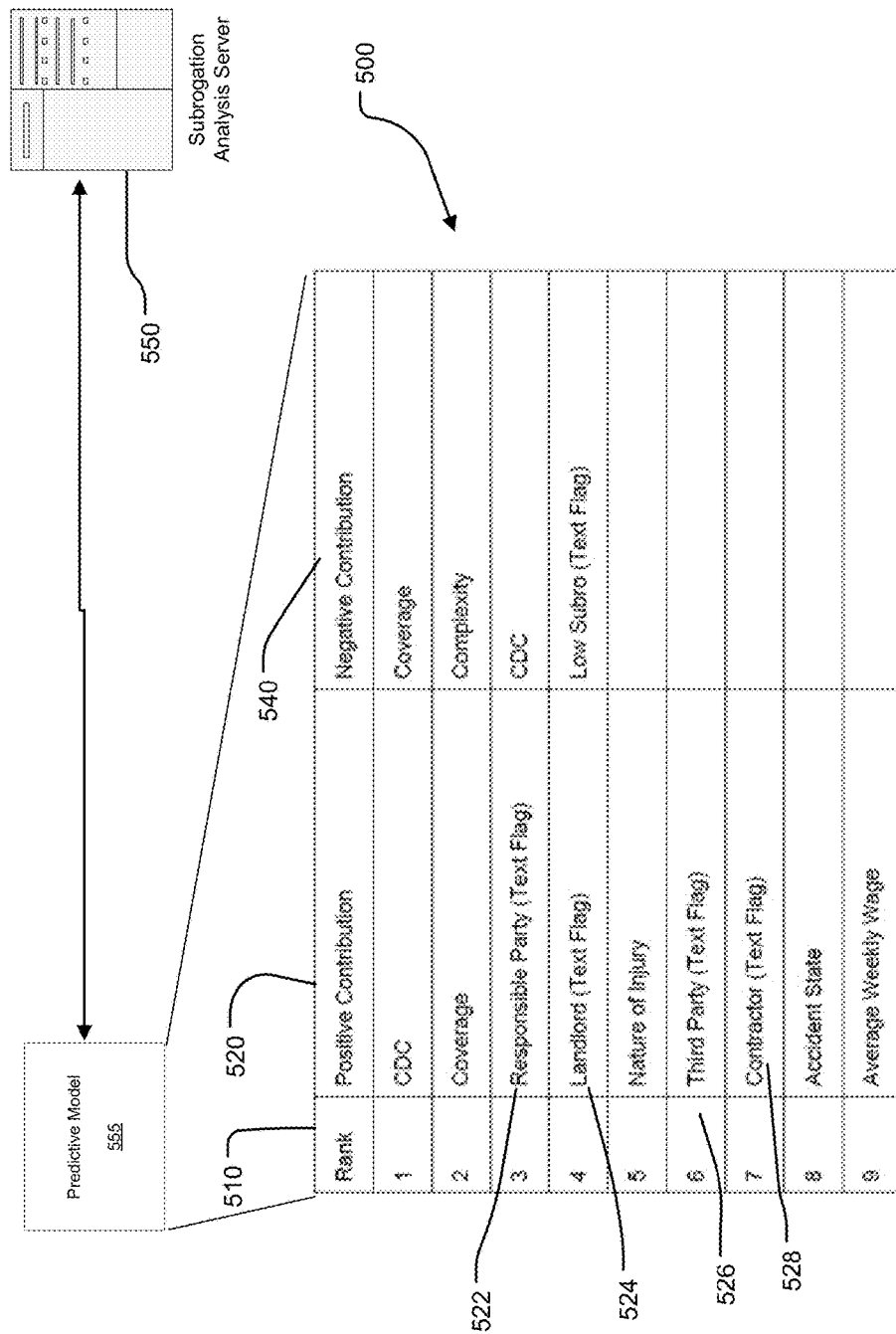
FIG. 5 illustrates data items having positive and negative values in an exemplary predictive model of the invention.

Referring now to FIG. 5, a table 500 is shown indicating exemplary relative importance of selected items of structured and unstructured data and whether their contribution to suitability for subrogation is positive or negative, in the predictive model 555 applied by subrogation analysis server 550. In column 510, a relative ranking is shown. In column 520, elements that may have a positive contribution to an indication of suitability are shown. The positive contribution may be dependent on the value of the data associated with the item. For example, the first value, CDC, relates to characteristics of the injury, and has a high contribution only for certain data values. For example, a CDC code indicating that the injury is related to an automobile is a positive indicator. The second positive item in column 520, coverage, has a positive contribution only if the coverage data value is indicative of coverage of the claim. Selected text flags, extracted from unstructured data, are shown at 522, 524, 526 and 528. Thus, identification of the phrases "responsible party" 522, "landlord" 524, "third party" 526 and "contractor" 528 results in a positive contribution to suitability. Other values vary. The nature of injury indicator may indicate a higher likelihood or be neutral. For example, a nature of injury indicator for a muscle strain may be neutral, as a muscle strain may result from improper lifting behavior rather than from third party causes. A nature of injury indicator for an injury indicator for a fracture may be positive, as fractures are more associated with incidents such as vehicular accidents that may involve other parties. The average weekly wage is generally correlated with a higher likelihood of subrogation with higher average weekly wage. A positive coefficient may be associated with one or more states in which an accident occurred. In embodiments, based on experience, the value of the positive coefficient may vary depending on the state.

The negative contribution factors in column 540 include particular values of certain factors that can have a positive contribution. Thus, the factors coverage, complexity and CDC may have either a positive or negative contribution, depending on the value. Thus, a CDC value indicating a repetitive motion injury has a negative contribution, by way of example.

Referring to FIG. 6, table 600 illustrates data values used by an exemplary predictive model according to an embodiment and application of the predictive model using the data values to three exemplary claims. Data element column 610 illustrates structured and non-structured data elements. Structured data elements are shown at 612 and include CDC, complexity, and other values. Non-structured data elements that may be identified via analysis of text are shown at 615 and include the terms landlord, contractor, responsible party and third party. First claim 620 indicates data values and associated coefficients for a first claim. Thus, for example, the data value column 621 indicates data values of structured data. The coefficient column 622 illustrates values of exemplary coefficients associated with the structured data values. Value column 623 provides the meaning of the particular data value, e.g., CDC 12 means a non-public transportation vehicle. First claim 620 includes certain values with positive coefficients in coefficient column 622, such as the type of vehicle, type of coverage and accident state being Florida. Of data elements extracted from unstructured data, only the "third party" element has a non-zero value. Thus, text mining of the unstructured data associated with claim 620 did not identify any instances of the "landlord," "no subro" or "contractor" data elements. Based on the coefficients associated with both structured and unstructured data, claim 620 has a relatively high value of likelihood of suitability for subrogation, as indicated at 630. Certain coefficients, such as have a value of zero, and thus the associated data elements do not change the subrogation suitability for the claim.

Second claim 640 relates to an animal attack. Data value column 641 indicates values of structured data for second claim 640, such as values of Complexity 2 in the complexity field and AWW 3 in the average weekly wage field. Only the CDC field, or type of incident field, which has an animal attack (workers compensation) indicator, has a positive coefficient. All of the unstructured data values have a coefficient and value of zero, indicating that no instances of the listed data elements were identified in the text mining of the unstructured data. Accordingly, the value 650 of claim 640 is lower than the value 630 determined for first claim 620.

Third claim 660 relates to a motion tendinitis injury. This injury has a negative coefficient 662 in the claim type field. The coverage field also has a negative coefficient 664, associated with the value state act cumulative injury. The only field associated with an unstructured data element, the "third party" field, has a positive coefficient 668, indicating that text mining of the unstructured data has identified the "third party" data. The value of subrogation likelihood 670 for third claim 660 is lower than either of first claim 620 or second claim 640.

Figure 7:
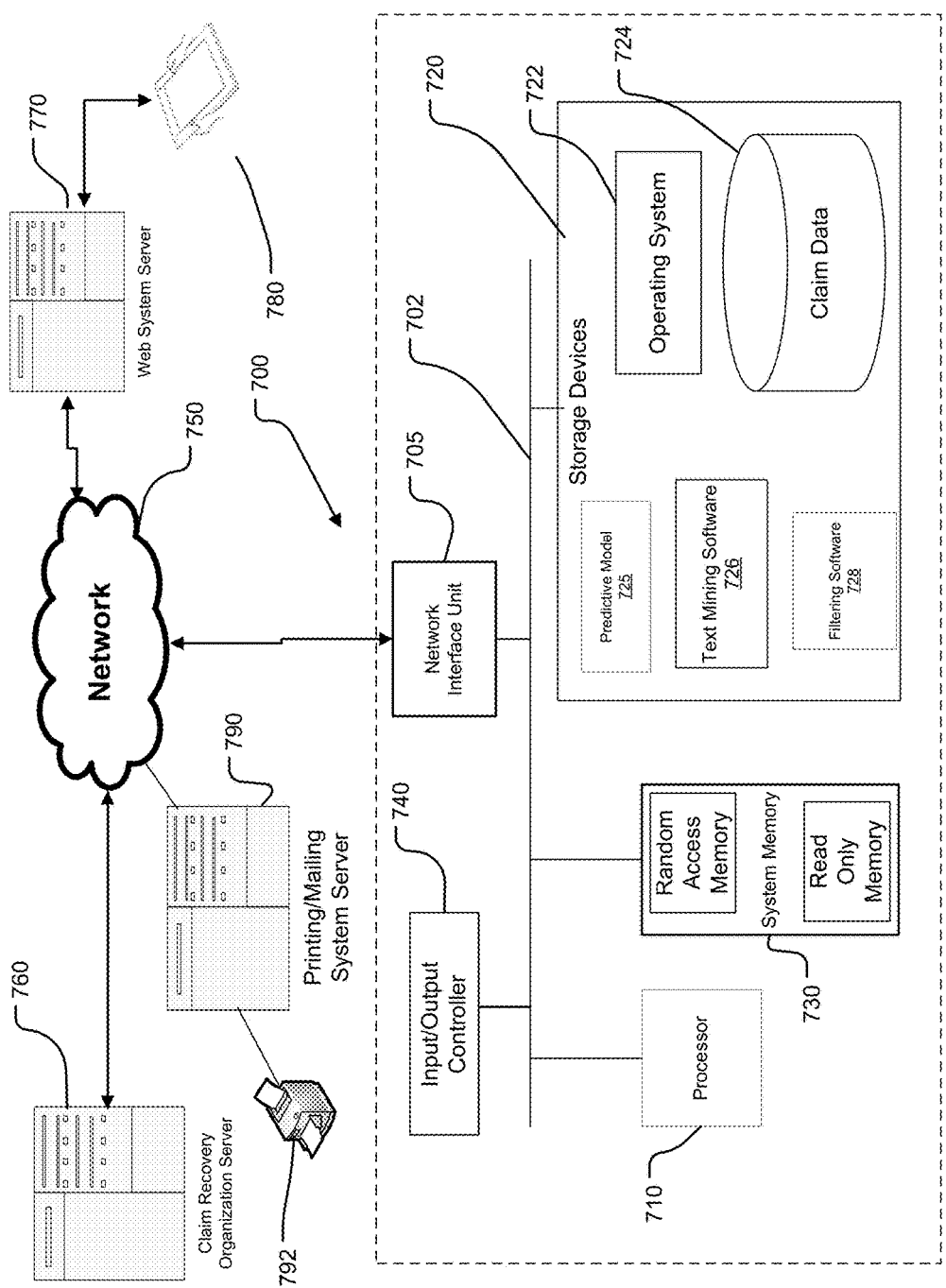
FIG. 7 is a schematic diagram of an exemplary computer system for analyzing subrogation likelihood in an embodiment of the invention.

Referring to FIG. 7, an exemplary computer system 700 for use in an implementation of the invention will now be described. In computer system 700, processor 710 executes instructions contained in application programs, which in this example include software for implementing predictive model 725, text mining software 726 and claim filtering software 728, which programs are stored as processor-executable instructions stored in non-transitory storage media, namely storage devices 720. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. Application programs 725, 726, 728 may include separate modules for discrete functions such as generating reports, providing user access to systems for such functions as modifying coefficients in the predictive model and terms to be identified by text mining software, generation of reports and other functions.

Storage devices 720 may include suitable non-transitory computer-readable storage media, such as optical or magnetic disks, fixed disks with magnetic storage (hard drives), flash memory, tapes accessed by tape drives, and other storage media. Processor 710 communicates, such as through bus 702 and/or other data channels, with network interface unit 705, system memory 730, storage devices 720 and input/output controller 740. Via input/output controller 740, processor 710 may receive data from user inputs such as pointing devices (including mice and trackballs), touch screens, audio inputs and keyboards, and may provide data to outputs, such as data to video drivers for formatting on displays, data to print drivers for transmission for printing in hard copy or to image files, and data to audio devices.

Storage devices 720 are configured to exchange data with processor 710, and may store programs containing processor-executable instructions, including instructions for accessing and filtering claims from database 724, performing text mining on unstructured data extracted from database 724, and applying the predictive model to structured and unstructured data extracted from database 724, among other available functions. Processor 710 is configured to perform steps in accordance with such processor-executable instructions. Processor 710 is configured to access data from storage devices 720, which may include connecting to storage devices 720 and obtaining data or reading data from the storage devices, or storing new and updated data into the storage devices 720. Storage devices 720 may include local and network accessible mass storage devices. Storage devices 720 may include media for storing operating system 722 and mass storage devices such as claim data 724 for storing data related to claims, including identification of injured employees or other claimants, employers, structured data relating to injuries and unstructured data such as notes, and other data.

Still referring to FIG. 7, in an embodiment, inputs may include user interfaces, including workstations having keyboards, touch screens, pointing devices such as mice and trackballs, or other user input devices, connected via networked communications to processor 710. Network interface unit 705 may communicate via network 750 with other insurance computer systems, such as claim recovery operation server 760, which may receive reports including data indicative of claims having a relatively high likelihood of subrogation according to predictive model 725, and with web system server 770 to permit system access via user devices such as tablet computer 780. In embodiments, web system server 770 may be configured to generate web documents for display of results of application of the predictive model 725 to claim data for users, such as claim recovery users and other analysts, and may be configured to permit suitably authorized users to review and update data such as coefficients in the predictive model 725.

Web system server 770, or a printing and mailing system 790 and printer 792 serve as a communications interface for providing reports and other communications to claim recovery organizations and other insurance company personnel. A printing and mailing system may include machinery for printing, folding, envelope stuffing and application of postage using automated postage meters, supplied by Neopost or other vendors.

Network interface unit 705 may further communicate with other insurance company computer systems, such as other computer systems maintaining databases relating to claims. By way of example, systems including data relating to claims of various types, such as short term disability claims and long term disability claims, may be accessed via network interface unit, processed using text mining software 726 and predictive model 725, and provided to claim recovery operation server 760 for action by claim recovery operation staff. In embodiments, other systems having data relating to claimants may be accessed. By way of example, social media data stored on computer systems of social media services may be accessed and included in data relating to claims analyzed using text mining software 726 and predictive model 725. Other third party data relating to claimants or claims may be accessed, including government data, such as data relating to police reports and reports to other municipal government units, property ownership data, vehicle ownership data, and other data.

Network 750 may be or include wired or wireless local area networks and wide area networks, and over communications between networks, including over the Internet. Any suitable data and communication protocols may be employed.

Figure 8:
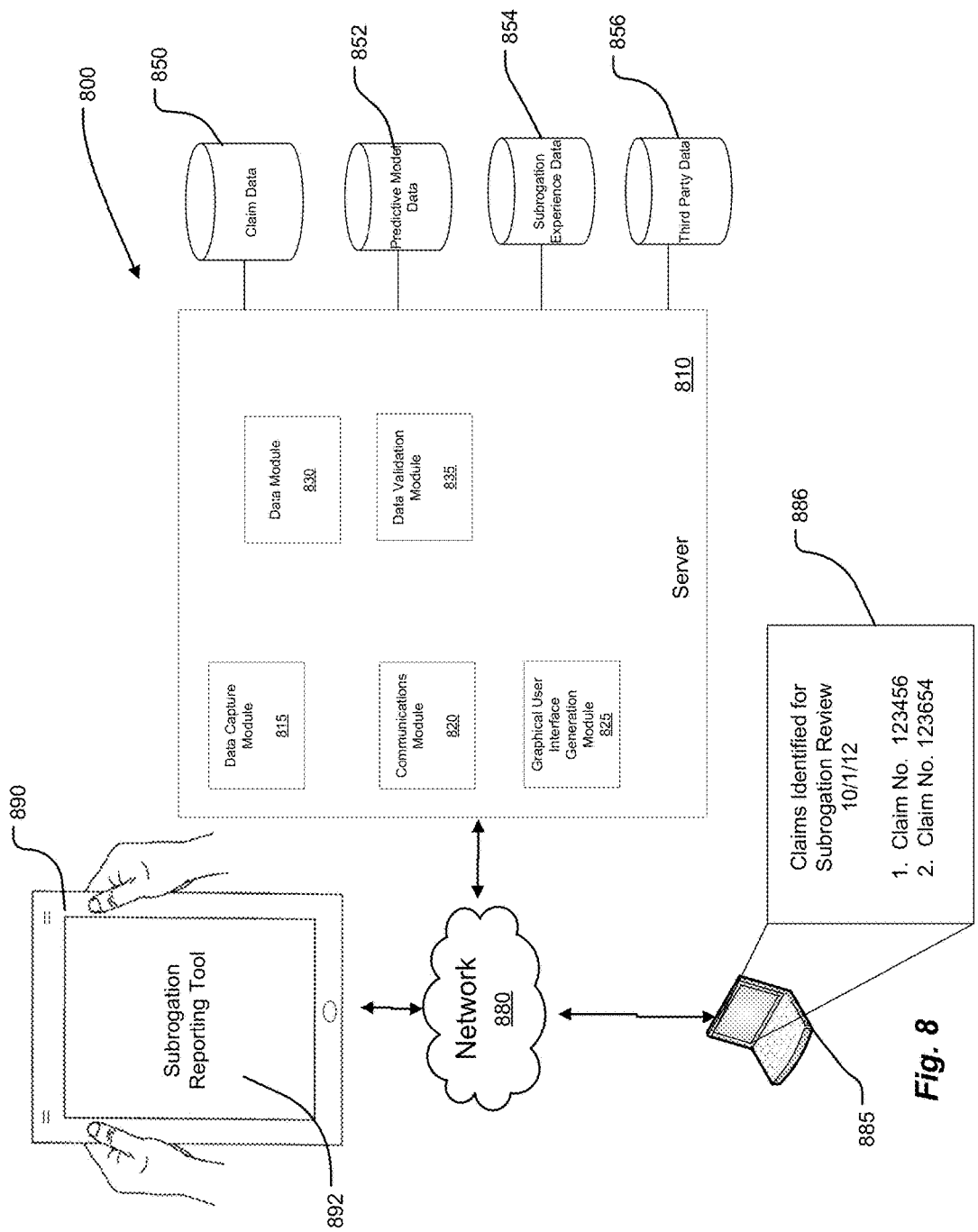
FIG. 8 is a diagram of an exemplary server computer and associated databases and networked devices in an implementation of a method and system of the invention.

Referring now to FIG. 8, another exemplary embodiment of a system 800 of the present invention is shown. System 800 includes an insurance company hardware server 810 which includes one or more engines or modules which may be utilized to perform one or more steps or functions of embodiments of the present invention. In an embodiment, the present invention is implemented as one or more modules of a computer software program in combination with one or more components of hardware. Such software programs will be used when a system user, such as an analyst overseeing analysis of existing claims, or an analyst comparing current text mining rules and predictive model configurations to experience of subrogation success/failure, has sent a request for data or information to a server and comprises part of the processing done on the server side of the network. Such software programs may also operate on an automated basis, such as a periodic batch basis to filter and extract claim data from a database, access data relating to claims or claimants from third party databases, apply text mining to data indicative of notes or other unstructured data, apply the predictive model, and format data indicative of claims having a relatively high likelihood of subrogation into reports for display, storage, printing and transmission to users via e-mail, upload to websites or other resources available over networks using suitable protocols, or otherwise.

The programs may be used in an Internet environment, where the server is a Web server and the request is formatted using HTTP (or HTTPS). Alternatively, the server may be in a corporate intranet, and extranet, or any other type of network. Use of the term "Internet" herein, when discussing processing associated with the user's request, includes these other network environments, unless otherwise stated. Additionally, a graphical user interface or other module may be implemented as an intelligent hardware component incorporating circuitry including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of a client device, such as tablet computer 890 or laptop 885, and capable of being accessed and executed by a processor of the client device.

Referring still to FIG. 8, server 810 includes a data capture or input/output module 815, a communications module 820, a dynamic display generation or graphical user interface module 825, a data module 830, and a data validation module 835. Data module 830 is in further communication with a number of databases such as claim database 850, predictive model database 852, subrogation experience database 854, and third party database 856. Databases 850, 852, 854, 856 may be implemented in one or more physical data storage devices in communication with server 810, or may be implemented in remote data storage devices accessible over one or more networks, such as cloud computer servers accessible via the Internet. Databases in communication with server 810 may include both internal and/or external/third party databases. By way of example, external databases may include databases maintained by medical care providers, health insurers, government agencies and social media service providers. Server 810 may be configured for bulk upload of data, such as bulk upload of data relating to new claims on a daily or other periodic basis, data relating to covered employees from an employer database, or data from medical providers relating to treatment provided in connection with claims. Such data may be furnished such as via a spreadsheet file or via suitable xml documents, by way of example. Data may be exchanged between server 810 and one or more legacy systems via suitable middleware systems. One or more modules, such as data validation module 835, may be configured to perform data validation steps prior to storing bulk uploaded data and data received from legacy systems via middleware systems. Data validation module 835 may further serve to verify internal consistency of data entered by one or more users. Server 810 may further be configured to permit bulk download of data, such as data relating to claims identified as having a relatively high potential for subrogation for review by a claim recovery operation.

In operation, server 810 is in communication with client devices, such as laptop computer 885 or tablet computer 890 via network 880 which facilitates interaction with server 810, such as through web documents, graphical user interfaces and application programs running on client devices 885, 890, as shown and described herein. As used herein, devices, such as client devices 885, 890 may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Referring still to FIG. 8, utilizing client devices 885, 890, a properly authenticated system user, such as a claim recovery operation employee, or a system administrator or analyst, may access data relating to claims and subrogation analysis. The authenticated user may also furnish data relating to claims or subrogation experience; for example, an employee from a claim recovery operation may provide data relating to subrogation experience for storing in subrogation experience database 854. The subrogation experience database may be employed for testing of coefficients and other data in the refinement and testing of the predictive model and configuration of the text mining software. By way of example, laptop computer 885 may be configured for remote access to server 810 by a representative of a claim recovery operation to review claims identified as having a high likelihood of subrogation. The system may be configured to provide a listing 886 of claims, ordered according to likelihood of subrogation, for review in response to a request from a claim recovery operation for a current list of claims.

By way of further example, tablet computer 890 may be configured for access by an administrator, who may review and analyze subrogation likelihood data using various data analysis and report tools 892.

A properly authenticated individual, such as an employee of an insurance company having administrative responsibilities, may access further data and provide updates and modifications to data, such as updates and modifications to predictive model data 852, such as to add or remove text and structured data and to change coefficients associated with items of data. Such a user may also have authorization to implement updates to processing logic employed by one or more of the modules 815, 820, 825, 830, 835. In embodiments of the present invention, one or more of the above modules, may also be implemented in combinations of software and hardware for execution by various types of computer processors coupled to such hardware.

Figure 9:
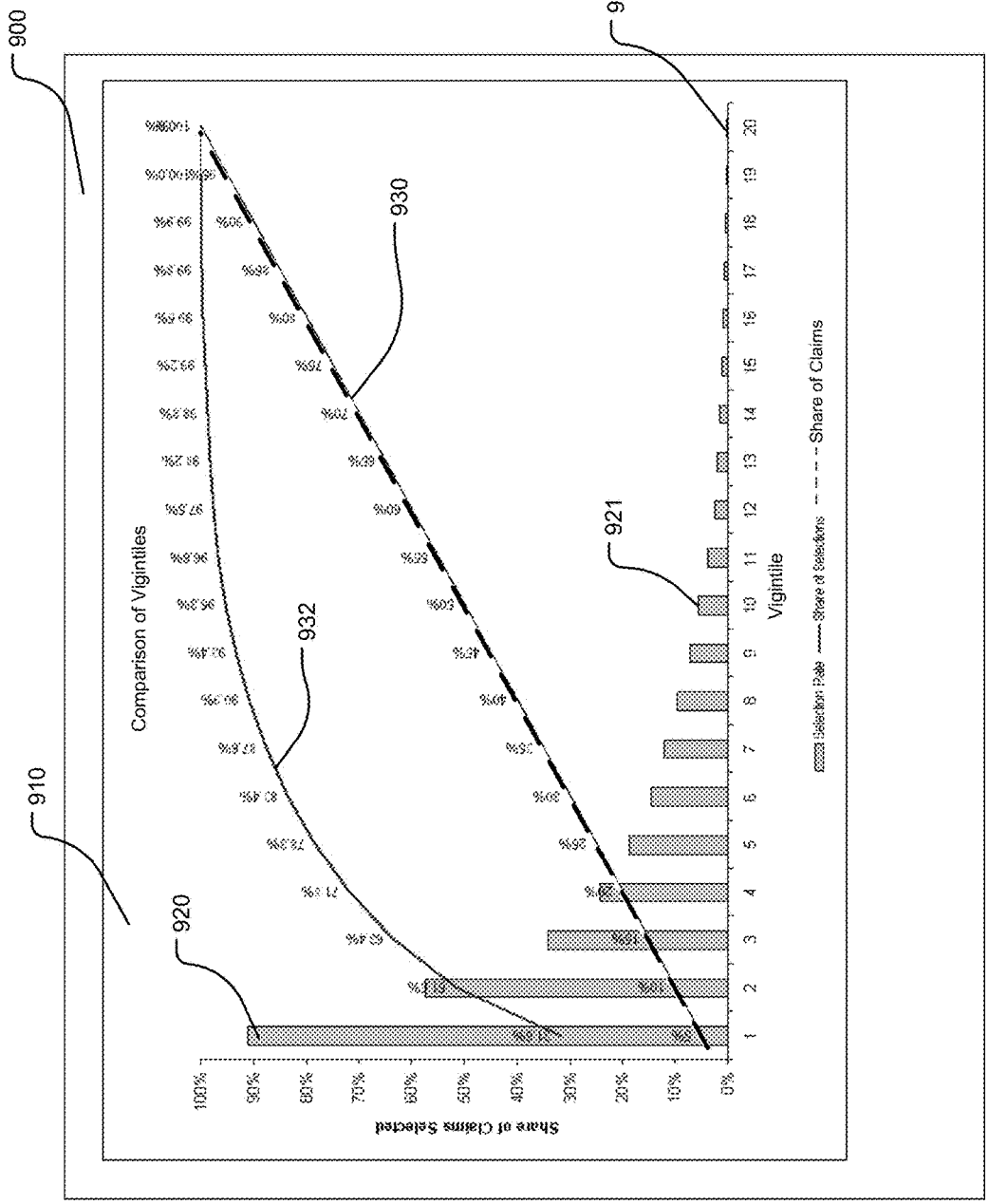
FIG. 9 is an exemplary graphical display of an analysis of subrogation likelihood of a set of claims.

Referring now to FIG. 9, user-accessible device 900 has on display 910 a chart representing grouping of claims by suitability for subrogation. In this example, claims have been grouped into 20 groups, or vigintiles, of equal numbers of claims in order of likelihood of subrogation. Thus, each of the 20 groups, or vigintiles, includes 5% of the claims reviewed. Thus, line 930 representing the total number of claims in cumulative vigintiles, is straight, as the total number of claims in the vigintiles increases by 5% for each vigintile. The number of groups may be varied. The display 910 includes data representing an exemplary experience of selection of claims for subrogation by a claim recovery organization of an insurance company. The bars represent the percentage of claims in each vigintile selected for subrogation. The percentage of claims selected in each vigintile declines, from over 90% in the first vigintile 920, to between 5 and 10% in the tenth vigintile 921, to only slightly above 0% in the twentieth vigintile 922. Line 932 represents the cumulative percentage of total claims selected for subrogation. As can be seen, over 95% of selected claims are contained in the first ten vigintiles.

The grouping of claims into groups of the same numbers, ranked in order of likelihood of subrogation as determined by the methods and systems described in this application, may further be employed in analysis of claims. For example, the change over periodic reviews of a claim from group to group may be indicative of likelihood of subrogation, in addition to other factors. For example, a claim, on first review, may be determined to have a low to moderate likelihood of subrogation, and be assigned to the $11^{th}$ vigintile. On a next review, based on additional data relating to the claim, the claim is assigned to the $9^{th}$ vigintile. On a third review, based on additional data relating to the claim, the claim is assigned to the $7^{th}$ vigintile. The velocity of change in vigintile to which a claim is assigned may be employed as a factor in determining whether to forward the claim to a cost recovery operation for further review for suitability for subrogation. Thus, a positive velocity in increase in vigintiles renders a claim more likely to be forwarded for review, while a negative velocity (e.g., from a $6^{th}$ vigintile on first review to a $7^{th}$ vigintile on second review) may render a claim less likely to be forwarded for review.

The groups, whether vigintiles or other groupings such as deciles or quintiles, may be used for selection of claims to submit to a claim recovery operation for further review. By way of example, the claims in the five highest vigintiles in each review may be selected for submission to the claim recovery operation.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, define the module and achieve the stated purpose for the module such as implementing the business rules logic prescribed by the present system. In embodiments of the present invention a module of executable code may be a compilation of many instructions, and may be distributed over two or more different code partitions or segments, among different programs, and across two or more devices. Similarly, data, including by way of example claims data, third party data, subrogation experience data and predictive model data may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

Throughout processing steps, accessed values, calculated values and draft data, for example, may be stored in temporary memory locations, such as in RAM, and then deleted or overwritten when no longer needed.

A processor may provide the central processing unit (CPU) functions of a computing device on one or more integrated circuits. The term "processor" may include multi-core processors and central processing units including multiple microprocessors. The central processing unit functionality may be provided at one or more remote locations, such as through application service provider and cloud computing services.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format, or a non-ACORD xml format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage devices may include hard magnetic disk drives, optical storage units, CD-ROM drives, or flash memory, by way of example. Data storage devices contain databases used in processing calculations embodied in algorithms, including data for display on client devices and data and rules for filtering of claims, by way of example. In one embodiment, database software creates and manages these databases. Calculations and algorithms in accordance with an embodiment of the present invention may be stored in storage devices and accessed and executed by a processor, in accordance with instructions stored in computer-readable storage media. Such algorithms may be embodied in modules of program code, or located in separate storage locations and identified in program code by pointers, by way of example.

Suitable computer program code may be provided for performing numerous functions such as analyzing claim data, determining subrogation likelihood, generating documents and reports that analyze and present results of determinations of subrogation likelihood, including determining and presenting statistical data, such as grouping by suitable segments and identifying data associated with such segments. The functions described above are merely exemplary and should not be considered exhaustive of the type of function which may be performed by the computer program code of embodiments of the present invention.

The computer program code required to implement the above functions (and the other functions described herein) can be developed by a person of ordinary skill in the art, and is not described in detail herein.

The systems described herein may be in communication with systems including printing and mailing systems, computer systems of employers including human resources departments computer systems, computer systems of medical providers, computer systems of other insurance companies, computer systems of social media service providers, and other computer systems.

The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

An exemplary advantage of a method and system of the present invention is that a system that implements embodiments may identify claims suitable for subrogation that would otherwise not have been reviewed for possible subrogation, and may avoid inefficient use of claim recovery operation resources in review of claims having a very low likelihood of subrogation.

While particular embodiments of the invention have been illustrated and described, various modifications and combinations can be made without departing from the spirit and scope of the invention, and all such modifications, combinations, and equivalents are intended to be covered and claimed.

What is claimed is:

1. A computer system, comprising:
    one or more data storage devices storing: a plurality of data records, each data record comprising stored data, the stored data comprising: structured data and unstructured data, the unstructured data comprising data indicative of communications between two or more persons;
    a data storage device storing data defining a predictive model for determining a score indicative of suitability of data records for forwarding to an operation system, responsive to receipt of one of the data records, the predictive model configured to perform the determination based on review of the structured data and words and phrases extracted from the data indicative of the unstructured data of the data record, the predictive model comprising data values and coefficients associated with structured data, certain data values being negative and indicative of a reduced suitability for forwarding, and certain data values being positive and indicative of an increased suitability for forwarding;
    an analysis hardware server, in communication with the data storage devices and comprising a processor configured to, on a recurring and dynamic basis, in each of a plurality of cycles:
        determine a set of data records, from the plurality of data records, for review by the predictive model, the set comprising data records having no score determined in any prior cycle and selected data records assigned scores in one or more prior cycles, the selected data records assigned scores in one or more prior cycles comprising data records not forwarded to the operation system and having selected aging intervals;
        extract words and phrases from the unstructured data associated with the determined set of data records using data mining to identify words and phrases for extraction, comprising using text parsing logic to identify sentences, and tagging identified words to be associated with categories and subcategories;
        apply the predictive model to the structured data and the extracted words and phrases from the unstructured data to determine a current-cycle score associated with each of the data records in the set, and assign each of the data records of the set to one of a plurality of groups of equal numbers ordered in accordance with the determined current-cycle score;
        for each of the data records of the set for which a score was determined in a prior cycle, determine whether the current-cycle score is greater than a most-recently determined prior cycle score for the same data record; and
        generate a report including at least some of the data records having no score determined in any prior cycle and the data records assigned scores in one or more prior cycles determined to have a greater current-cycle score than the most-recently determined prior cycle score for the same data record;
        determine a velocity of change in group to which each data record is assigned;
        based at least in part on the determined velocity of change in group to which a data record is assigned, and based on whether a current-cycle score is at least a threshold value, select a plurality of the data records for forwarding to an operation system, wherein a positive velocity of change in group renders a data record more likely to be selected for forwarding, and a negative velocity of change in group renders a data record less likely to be selected for forwarding; and
        forward, via bulk download using xml documents, to the operation system, the data records selected for forwarding.

2. The computer system of claim 1, wherein the data records comprise data indicative of workers compensation claims, and the data indicative of communications comprises at least notes based on conversations between claim handlers and one or more of injured individuals and employer representatives.

3. The computer system of claim 1, wherein the generating a report comprises grouping claims by score.

4. The computer system of claim 1, wherein the selected data records assigned scores in one or more prior cycles comprise data records not forwarded to the operation system and having selected aging intervals.

5. The computer system of claim 1, wherein the data records comprise data indicative of workers compensation claims and the structured data values comprise an on premises indicator having a positive or negative value and nature of injury indicator.

6. The computer system of claim 1, wherein the structured data values include a report lag indicator, having a positive coefficient for a short report lag value and a negative coefficient for a long report lag value.

7. The computer system of claim 1, wherein the predictive model comprises a plurality of terms capable of extraction from unstructured data and positive and negative coefficients associated with the terms.

8. The computer system of claim 7, wherein the terms comprise contractor and landlord, a positive coefficient being associated with those terms.

9. The computer system of claim 7, wherein the data records comprise workers compensation claims and one or more of the coefficients are employer description dependent.

10. The computer system of claim 1, further comprising a claim recovery operation hardware server in communication with the processor and configured to receive claim and likelihood of subrogation data.

11. A computer-implemented method, comprising:
storing in one or more data storage devices a plurality of data records, each of the data records comprising structured data and unstructured data, the unstructured data comprising data indicative of communications between two or more persons;
on a recurring and dynamic basis on a cycle accessing by a processor of an analysis hardware server from the one or more data storage devices data relating to the data records to determine a set of data records for review, the set of data records including data records having no score determined in any prior cycle and data records assigned scores in one or more prior cycles, the selected data records assigned scores in one or more prior cycles comprising data records having selected aging intervals;
processing by the processor using data mining the unstructured data to extract words and phrases from the unstructured data, comprising using text parsing logic to identify sentences, and tagging identified words to be associated with categories and subcategories;
applying, by the processor, to each of the data records of the set, a predictive model for determining a current-cycle score indicative of suitability of data records for forwarding to an operation system, the predictive model being configured to perform the determination responsive to receipt of one of the data records based on review of the structured data and words and phrases extracted from the unstructured data, to the structured data and the extracted words and phrases from the unstructured data of the data record, the predictive model comprising data values and coefficients associated with structured data certain data values being negative and indicative of a reduced suitability for forwarding, and certain data values being positive and indicative of an increased suitability for forwarding, and assigning each of the data records of the set to one of a plurality of groups of equal numbers ordered in accordance with the determined current-cycle score;
determining by the processor, for each of the data records in the set for which a score was determined in a prior cycle, whether the current-cycle score is greater than a most recently determined prior cycle score;
generating by the processor a report including at least some of the data records having no score determined in any prior cycle and the data records assigned scores in one or more prior cycles determined to have a greater score than the most-recently determined prior score for the same data record;
determining by the processor a velocity of change in group to which each data record is assigned;
based at least in part on the determined velocity of change in group to which a data record is assigned, selecting by the processor a plurality of the data records for forwarding to an operation system, wherein a positive velocity of change in group renders a data record more likely to be selected for forwarding, and a negative velocity of change in group renders a data record less likely to be selected for forwarding; and
forwarding, via bulk download using xml documents, to the operation system, the data records selected for forwarding.

12. The computer-implemented method of claim 11, wherein the selected previously-reviewed data records comprise data records not forwarded to the operation system and having selected aging intervals.

13. The computer-implemented method of claim 12, wherein the selected aging intervals include a first aging interval of between 10 and 45 days and a second aging interval of at least 180 days.

14. The computer-implemented method of claim 11, further comprising storing in the one or more data storage devices data relating to the previously reviewed data records not having a greater score than a most-recently determined prior score for the same data record.

15. The computer-implemented method of claim 11, wherein the predictive model comprises a plurality of structured data values and coefficients associated with each of the structured data values.

16. The computer-implemented method of claim 11, wherein the data records comprise data records indicative of claims under property insurance policies.

17. A non-transitory computer-readable storage medium, the computer-readable storage medium having processor-executable instructions stored, which instructions, when executed by a processor, cause the processor to:
on a recurring and dynamic basis on a cycle, in each of a plurality of cycles, access from one or more data storage devices stored data relating to data records to determine a set of data records for review, the selected data records including data records having no score determined in any prior cycle and selected data records assigned scores in one or more prior cycles, the selected data records assigned scores in one or more prior cycles comprising data records having selected aging intervals, the stored data comprising structured data and unstructured data, the unstructured data comprising data indicative of communications between two or more persons;
process using data mining the data indicative of the unstructured data to extract words and phrases from the unstructured data of the data records of the set of data records, comprising using text parsing logic to identify sentences, and tagging identified words to be associated with categories and subcategories;
apply a predictive model for determining a current-cycle score indicative of suitability of data records for forwarding to an operation system, for each of the data records of the set, based on review of the structured data and words and phrases extracted from the unstructured data, to the structured data and the extracted words and phrases from the unstructured data to determine a score associated with each of the data records of the set, the predictive model comprising data values and coefficients associated with structured data certain data values being negative and indicative of a reduced suitability for forwarding, and certain data values being positive and indicative of an increased suitability for forwarding, and assign each of the data records to one of a plurality of groups of equal numbers ordered in accordance with determined current-cycle scores;
determine, for each of the data records having a score determined in one or more prior cycles, whether the current-cycle score is greater than a most recently determined prior cycle score;

generate a report including at least some of the data records having no score determined in any prior cycle and the data records assigned scores in one or more prior cycles determined to have a greater score than the most-recently determined prior score for the same data record;

determine a velocity of change in group to which each data record is assigned;

based at least in part on the determined velocity of change in group to which a data record is assigned, select a plurality of the data records for forwarding to the operation system, wherein a positive velocity of change in group renders a data record more likely to be selected for forwarding, and a negative velocity of change in group renders a data record less likely to be selected for forwarding; and forward, via bulk download using xml documents, to the operation system, the data records selected for forwarding.

18. The non-transitory computer-readable storage medium of claim 17, wherein the instructions further cause the processor to select data records having no score determined in any prior cycle for inclusion in the report based on the determined score.

19. The non-transitory computer-readable storage medium of claim 17, wherein the instructions further cause the processor to transmit the report to the operation server for further review.

* * * * *